(12) United States Patent
Hutchinson et al.

(10) Patent No.: US 9,768,876 B1
(45) Date of Patent: Sep. 19, 2017

(54) METHOD OF SUPPRESSING POLARIZATION-DEPENDENT LOSS IN POLARIZATION-MODULATED PHOTONIC LINKS

(71) Applicant: THE UNITED STATES OF AMERICA, AS REPRESENTED BY THE SECRETARY OF THE NAVY, Washington, DC (US)

(72) Inventors: Meredith N. Hutchinson, Washington, DC (US); Nicholas Frigo, Silver Spring, MD (US); Vincent J. Urick, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/220,502

(22) Filed: Jul. 27, 2016

(51) Int. Cl.
| | |
|---|---|
| H04B 10/532 | (2013.01) |
| H04B 10/2513 | (2013.01) |
| H04B 10/25 | (2013.01) |
| H04B 10/2507 | (2013.01) |
| H04B 10/2575 | (2013.01) |

(52) U.S. Cl.
CPC ....... *H04B 10/532* (2013.01); *H04B 10/2572* (2013.01); *H04B 10/2575* (2013.01); *H04B 10/25133* (2013.01)

(58) Field of Classification Search
None
See application file for complete search history.

(56) References Cited

U.S. PATENT DOCUMENTS

| | | | |
|---|---|---|---|
| 5,311,346 A | 5/1994 | Haas et al. | |
| 5,371,597 A | 12/1994 | Favin et al. | |
| 5,739,943 A * | 4/1998 | Ohshima | G02F 1/0311 324/244.1 |
| 6,130,766 A * | 10/2000 | Cao | H04B 10/2572 398/1 |
| 6,347,164 B1 | 2/2002 | Rudkevich | |
| 6,975,454 B1 | 12/2005 | Yan et al. | |
| 7,010,180 B2 | 3/2006 | Van Wijngaarden et al. | |
| 7,206,517 B1 | 4/2007 | Yu et al. | |
| 7,382,985 B2 | 6/2008 | Roberts et al. | |
| 8,977,137 B2 | 3/2015 | Vassilieva et al. | |
| 9,172,471 B2 | 10/2015 | Hutchinson et al. | |

* cited by examiner

Primary Examiner — Darren E Wolf
(74) Attorney, Agent, or Firm — US Naval Research Laboratory; Surech Koshy (57) ABSTRACT

A method of suppressing polarization-dependent loss in a signal. A constant-intensity, analog, optical signal with modulating polarization is transmitted through an optical communications link. The constant-intensity, analog, optical signal with modulating polarization includes an analog radio frequency signal impressed upon a polarization-modulated, laser signal. A polarization-dependent loss of the communications link is determined, the polarization-dependent loss inducing an induced phase shift in the constant-intensity, analog, optical signal with modulating polarization. The constant-intensity, analog, optical signal with modulating polarization is re-oriented using a polarization transformer so as to suppress the induced phase shift.

12 Claims, 4 Drawing Sheets

METHOD OF SUPPRESSING POLARIZATION-DEPENDENT LOSS IN POLARIZATION-MODULATED PHOTONIC LINKS

BACKGROUND OF THE INVENTION

Field of the Invention

This invention relates in general to a method of suppressing polarization-dependent loss in a signal, and in particular to a method of suppressing the effect of polarization-dependent loss in a signal in an analog, polarization-modulated, RF photonic optical link.

Description of the Related Art

The use of polarization modulators ("PolM") in analog optical links has been made possible with the advent of reliable modulators with modest $V_z$ voltages and the ability to apply separate DC-controlled static biases. PolMs have been demonstrated for a variety of applications of photonic links, such as orthogonally polarized single-sideband modulator, intensity noise suppression, third order distortion suppression, frequency doubling optoelectronic oscillator, and photonic analog-to-digital convertor applications.

Common impairments of such analog optical links employing PolMs include chromatic dispersion, photodiode distortion correction, and/or polarization-dependent loss ("PDL"). Of these, PDL is a dominant impairment of PolM links because it creates unintentional intensity modulation in the same manner as the detection process.

BRIEF SUMMARY OF THE INVENTION

An embodiment of the invention includes a method for the reduction or cancellation of PDL in an analog optical link employing a PolM. An illustrative benefit of this embodiment of the instant invention is that, optionally, no additional equipment is needed to reduce even-order distortion since the link.

An embodiment of the invention allows at least one point of adjustment or mitigation for PDL in an analog, polarization-modulated, photonic link. For example, as discussed below, a method embodiment of the invention includes a photonic link having two points of adjustment: (1) at on the transmit side via the DC bias port of the PolM; and (2) at receive side via the rotatable half-wave plate ("HWP"). In an embodiment of the invention, the rotatable HWP provides a smaller feedback loop than the DC bias, as the HWP is located close to the receiver.

DETAILED DESCRIPTION OF THE INVENTION

Inventors have appreciated that heretofore PDL analyses have not been applicable to characterizing distortions of analog links. Inventors determined that the penalty on even-order distortion generated in the link can be substantial for a discrete PDL. Inventors further determined that the PDL distortion was equivalent to a bias phase offset, as discussed in greater detail hereinbelow.

Figure 1:
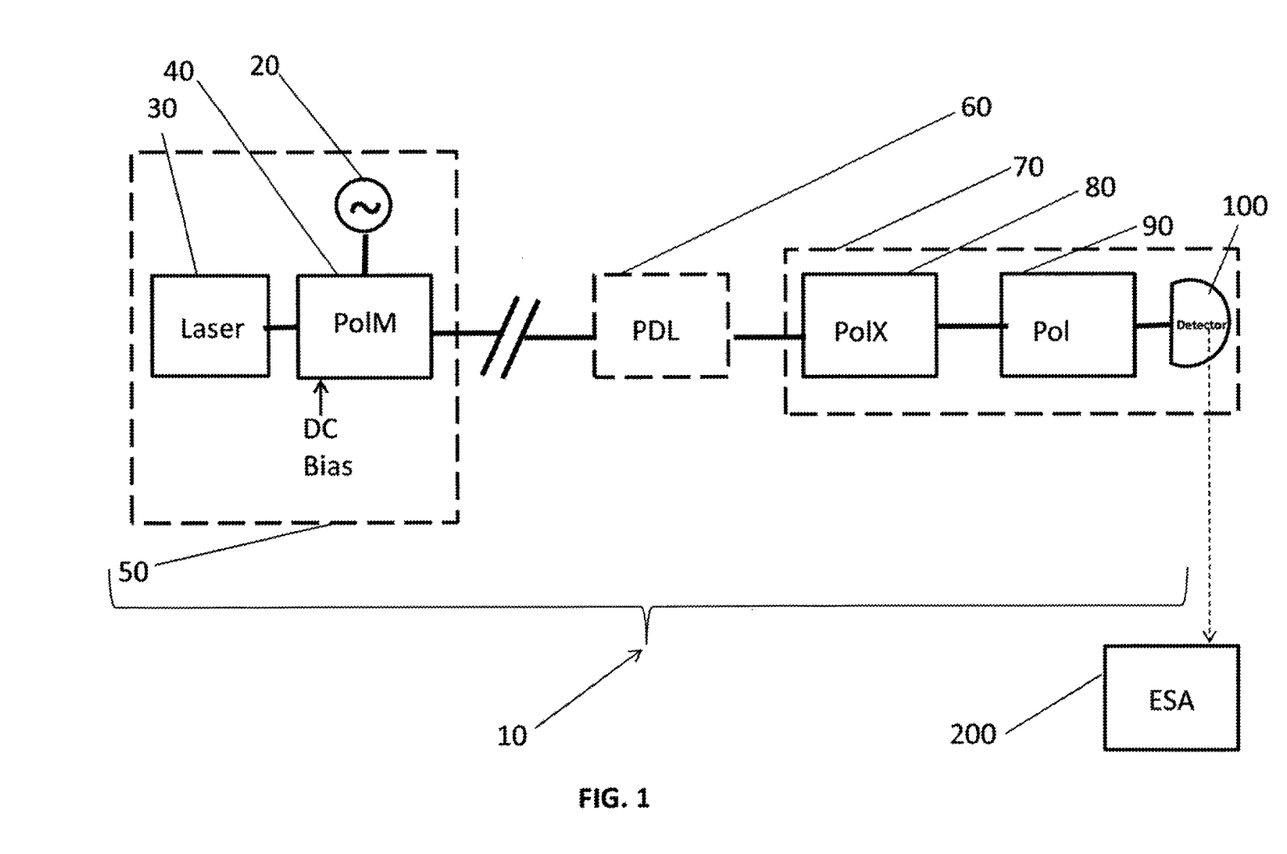
FIG. 1 is an illustrative, analog, polarization-modulated, photonic link for use with an embodiment of the invention.

The following discussion includes an analysis of the effect of a discrete PDL on analog signals, a determination of a functional form of the output, and a showing of its equivalence to a bias phase shift with distortionless loss. FIG. 1 shows by way of illustration, a block-diagram, or schematic, representation of a polarization-modulated RF photonic link 10 for use in accordance with an embodiment of the invention. A standard RF signal 20 is impressed on the output of a standard continuous wave laser 30 through a standard PolM 40 in a standard transmitter 50, and the result is sent through the link 10, which includes a partial polarizer modeling PDL 60 for the signal. For the purposes of this patent application, it should be understood that the partial polarizer itself is not PDL. Rather, PDL results from a partial polarizer because, by definition, PDL is a polarization dependent loss incurred by partial polarization. At a standard receiver 70, a polarization transformer ("PolX") 80 reorients the incoming signal's polarization to counteract the polarization evolution in the link 10. This reorientation permits a standard discriminating polarizer or polarization discriminator ("Pol") 90 (such as a polarization beam splitter) to create optimal signal development, detected by a standard detector 100 as optical power fluctuations. The discriminating polarizer 90 only lets through a signal having polarization corresponding to its pass axis.

Figure 2A:
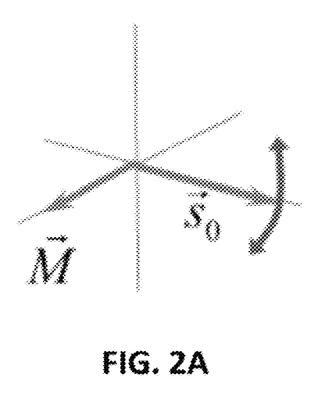
FIG. 2A is a graphical representation of states of polarization being traced out in an arc in Stokes vector space when an RF signal is impressed onto a state of polarization by a polarization modulator.
Figure 2B:
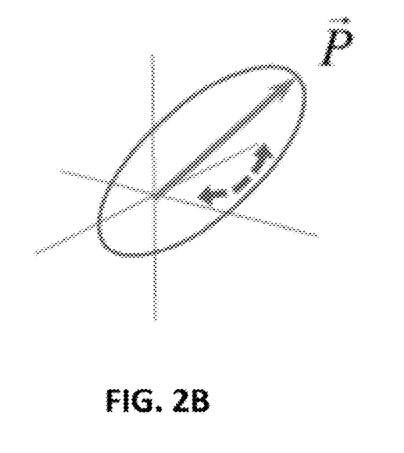
FIG. 2B is a graphical representation of states of polarization in Stokes vector space, wherein the arc of states of polarization are distorted at the receiver in the presence of link PDL.
Figure 2C:
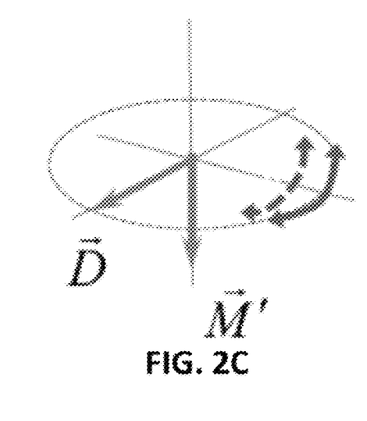
FIG. 2C is a graphical representation of states of polarization in Stokes vector space, wherein ideal link operation is shown as a solid arc, which has been oriented by a polarization transformer to correspond to a "rocking", or modulation, of linear states of polarization about the quadrature point with respect to the detector polarization pass state.
Figure 3A:
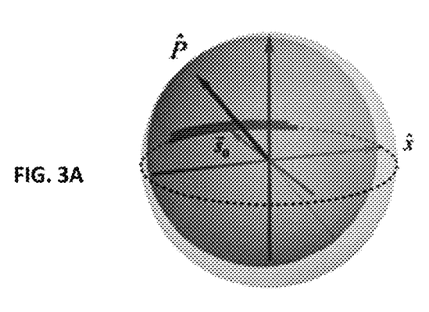
FIG. 3A is a Stokes/Poincaré representation of transmitted power on states of polarization for a very low blocking axis transmission t=0.9.
Figure 3B:
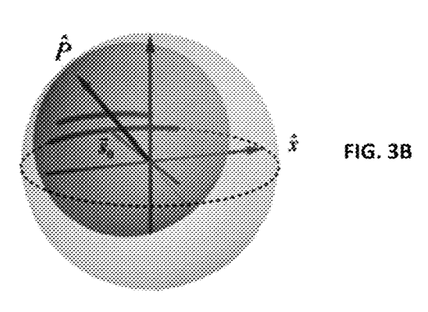
FIG. 3B is a Stokes/Poincaré representation of transmitted power on states of polarization for a low blocking axis transmission t=0.7.
Figure 3C:
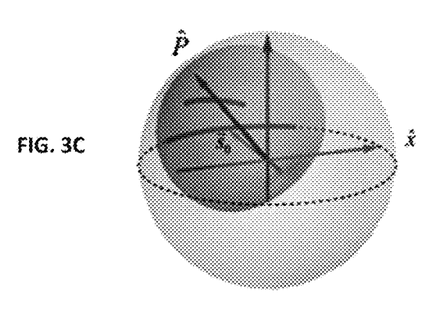
FIG. 3C is a Stokes/Poincaré representation of transmitted power on states of polarization for a low blocking axis transmission t=0.4.
Figure 3D:
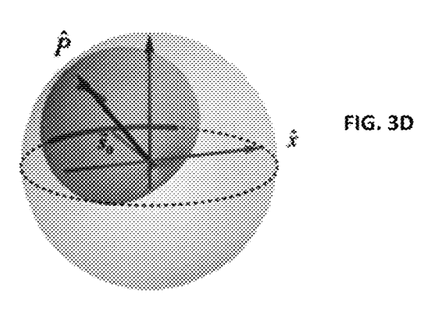
FIG. 3D is a Stokes/Poincaré representation of transmitted power on states of polarization for a very high blocking axis transmission t=0.1.

FIG. 2A-C show the Stokes vector representation of the basic polarization-modulated link shown in FIG. 1A. Light is launched at 45° to the PolM's birefringent axes, and, the RF input creates a time-dependent birefringence, which changes the relative phases of light in the x and y polarizations. This phase shift is seen in Stokes space as a rotation about the vector M, representing the birefringent "slow" eigenstate. Thus, changes in the birefringence of the PolM, caused by the RF signal, lead to rotations of the state of polarization ("SOP") in Stokes vector space, shown as a solid arc centered about the launch state $s_0$, as shown, by way of example, in FIG. 2A. PDL with pass axis P distorts the arc in both orientation and amplitude, favoring the pass axis, as shown by way of example in FIG. 2B. In the presence of link PDL, the arc of SOPs is distorted at the receiver 70 (designated in FIG. 2B by the dashed curve), leading to link impairments. At the detector 100, as shown by way of example in FIG. 2C, optimal operation of the polarization-modulated link is shown as a solid arc, which has been oriented by the PolX 80 to correspond to a "rocking" of linear state D. In the absence of PDL, the modulated SOPs at the receiver 70 are imaged by the PolX 80 into the solid arc along the equator in FIG. 2C. Points on this arc rotate about $M^1$, the image of PolM M. The center of the imaged arc, the state corresponding to zero modulation is oriented at 45° in real space (90° in Stokes vector space) to the pass axis for the receiver's analyzer, D. Using the half-angle projection in Stokes vector space, an angular rotation by modulation phase Φ along the equator towards the pass axis of "Pol" would result in a photocurrent $i_{det}$ proportional to the square of the field:

$$i_{det} \approx \cos^2\left(\frac{\pi/2 - \phi}{2}\right) = \frac{1}{2}(1 + \sin\phi). \quad (1)$$

This modulated intensity illustrates the similarity between ideal intensity-, phase-, and polarization modulated links.

Again, in the presence of link PDL 60, the ideal arc of SOPs is distorted in both magnitude and direction as represented by the dashed curve, as shown, by way of illustration, in FIG. 2C. Because the arc, in general, will also have moved off the equatorial plane, the relationship between the applied modulation phase Φ and the half angle expressed in Equation (1) will no longer be valid. In short, Inventors expected there to be non-linear distortions in a PolM link subject to PDL.

Inventors determined that a model of PDL is that of an ideal partial polarizer, in Jones space:

$$P = \begin{bmatrix} 1 & 0 \\ 0 & t \end{bmatrix} = \frac{1+t}{2}\begin{bmatrix} 1 & 0 \\ 0 & 1 \end{bmatrix} + \frac{1-t}{2}\begin{bmatrix} 1 & 0 \\ 0 & -1 \end{bmatrix} \quad (2)$$

where P has been expanded in terms of the 2×2 identity matrix, $\sigma_0$ and the Pauli matrix $\sigma_0$. (The "$\sigma_z$" Pauli matrix is usually called $\sigma_1$ in lightwave applications, and is associated with the x-axis of a 3-D representation.) For Hermitian matrices, an expansion in the Pauli matrix basis set results in four numbers, of which three can be associated with the components of a 3-D vector, illustratively $\vec{P}$ in Stokes space. In the case of Equation (2), the operator $$P = \left(\frac{1+t}{2}\right)\sigma_0 + \left(\frac{1-t}{2}\right)\hat{e}_1 \cdot (\sigma_1\hat{e}_1 + \sigma_2\hat{e}_2 + \sigma_3\hat{e}_3) \quad (3)$$
$$= p_0\sigma_0 + \overline{P}\hat{P}\cdot\hat{\sigma} = p_0\sigma_0 + \vec{P}\cdot\hat{\sigma},$$

is associated with the average field transmission $p_0=(1-t)/2$, pass eigenstate $\hat{P}=\hat{e}_1$, and PDL vector $\vec{P}=\overline{P}\hat{P}$, having differential field magnitude $\overline{P}=(1-t)/2$. For a general polarizer with $0 \le t \le 1$, $$p_0^2 + \vec{P}\cdot\vec{P} = \frac{1+t^2}{2} \quad (4)$$
$$p_0^2 - \vec{P}\cdot\vec{P} = t.$$

Once the operator P is cast in the form of Equation (3), it can be generalized to any eigenstate $\hat{P}$. Thus, the second line of Equation (3) is general and describes any orientation for the pass state of the link PDL 60 or the receiver's standard electrical spectrum analyzer 200 (discussed further below).

To motivate the impact of PDL impairments, Inventors examined the transformation of state $|s\rangle$ incident on a partial polarizer to its output state $|s_f\rangle$, in terms of the corresponding Stokes vectors $\vec{s}$ and $\vec{s}_f$. Because $$\vec{s}_f = \langle s_f|\hat{\sigma}|s_f\rangle = \langle s|P^\dagger\hat{\sigma}P|s\rangle \quad (5)$$

and the norm of $\vec{s}$ is $|\vec{s}|=\langle s|\rangle=s^2$, $$\vec{s}_f = s^2[(p_0^2-P^2)\hat{s}+2(p_0+\vec{P}\cdot\hat{s})\vec{P}], \quad (6)$$

where $P^2=\vec{P}\cdot\vec{P}$ and $\hat{s}$ is the unit Stokes vector for $\vec{s}$. From this, Inventors determined the power transmission to be:

$$T=(p_0^2+P^2)+2p_0(\vec{P}\cdot\hat{s}), \quad (7)$$

giving the expected transmission characteristic.

To illustrate the impact of PDL impairments on the modulated photonic, or optical, link, Inventors examined the effect of P on SOPs for several values of blocking axis transmission t. FIGS. 3A-3D show, by way of illustration, Stokes/Poincaré sphere representations of PDL impairments versus blocking axis transmission t, for values of t=0.9, 0.7, 0.4, and 0.1, respectively. After modulation, the SOPs form an arc on the Poincaré sphere. In traversing the link, the arc is transformed by birefringent elements along the way, each element creating a rotation of SOPs on the sphere. This sequence of rotations is equivalent to a single net radiant, so that in the absence of impairments, the SOPs at the receiver form a displaced arc similar to the arc at the transmitter. The inner sphere represents the magnitude of the transmitted power through a partial polarizer. (Recall that Inventors have modeled PDL as a partial polarizer). Conventionally, states of linear SOP are displayed on the "equator" of the outer sphere. If all of the states of linear SOP are on the equator, the incoming arc is transformed into linear SOPs with a modulated angle. The arc of SOPs incident on the "equator" is transformed into a distorted arc that changes in both magnitude and direction depending on the value of the blocking axis transmission t. The outer spheres represent the unattenuated SOPs that are, for example, incident on the partial polarizer. The partial polarizer is represented by an arbitrary $\hat{P}$: in this case, upward to the left, and "behind" the page. An arc of modulated SOPs is shown on the "far side" of the sphere, centered on the quiescent SOP, $\vec{s}_0$ at 90° to the $\hat{x}$ (or $\hat{e}_1$) vector in this Stokes/Poincaré sphere representation. Absent PDL, such an arc of modulated SOPs would be ideally biased and would operate as described in Equation (1). PDL, characterized by $\hat{P}$, distorts this ideal operation as indicated by the inner surfaces in each of FIGS. 3A-3D, drawn to represent the transmitted power T, for each SOP, as in Equation (7). Four such surfaces, corresponding to different values of t in Equation (2) are shown, with FIGS. 3A-3D running from 0.9 to 0.1. Also shown in FIGS. 3A-3D are the arcs, inside those surfaces, corresponding to SOPs emerging from the partial polarizer. (For an ideal link with no PDL, blocking axis transmission t=1). For low PDL, such as when t=0.9 in FIG. 3A, for example, the input and output arcs are similar. For t=0.4 in FIG. 3C, for example, the presence of a "dimple' in the rejected SOP (opposite to $\hat{P}$) is becoming evident, as well as indications that the arc is distorted in direction. For high PDL, such as when t=0.1 in FIG. 3D, for example, a dimple representing the rejected SOP's transmission is visible, and the transmitted SOPs are nearly coincident with the pass axis line.

Inventors modeled the polarization-modulated photonic link as launch state $|s_0\rangle$ evolved under operators for the modulator (M), PDL (P) and polarization discriminator (D). At the PD, output state $|s_f\rangle$ is $$|s_f\rangle = DPM|s_0\rangle \quad (8)$$

and the normalized optical intensity is $$i_{det} \approx \langle s_f|s_f\rangle = \langle s_0|M^\dagger P^\dagger D^\dagger DPM|s_0\rangle. \quad (9)$$

P and D are covered by Equations (2)-(4), and M is modeled by $$\begin{bmatrix} E_{x\,out} \\ E_{y\,out} \end{bmatrix} = \begin{bmatrix} e^{-j\phi/2} & 0 \\ 0 & e^{+j\phi/2} \end{bmatrix} \begin{bmatrix} E_{x\,in} \\ E_{y\,in} \end{bmatrix} = M_0(\phi)\begin{bmatrix} E_{x\,in} \\ E_{y\,in} \end{bmatrix},$$

which introduces a phase difference of $\Phi$ between the x and y components of the field. Inventors expressed this as $$M_0(\phi) = \begin{bmatrix} \cos(\phi/2) - j\sin(\phi/2) & 0 \\ 0 & \cos(\phi/2) + j\sin(\phi/2) \end{bmatrix} \quad (10)$$

$$= \cos(\phi/2)\sigma_0 - j\sin(\phi/2)\vec{M}\cdot\hat{\sigma},$$

Where $\vec{M}=\hat{e}_1$ represents the slow eigenstate of the modulator. Again, a similarity transform allows this to be generalized to any $\vec{M}$.

Using Equation form (4) and employing Equation (10) for operator M, Inventors substituted into Equation (9) to solve for the photocurrent. Assuming negligible dispersion and an ideal modulator, the detector photocurrent is given by $$i_{det}(\phi) = \frac{1}{2}(c_1 + \vec{A}\cdot\hat{s}) + \frac{\vec{M}\cdot\vec{M}}{2}(c_1 - \vec{A}\cdot\hat{s}) + \quad (11)$$

$$(\vec{A}\cdot\vec{M})(\vec{M}\cdot\hat{s}) + [\vec{A}\times\vec{M}\cdot\hat{s} - (\vec{A}\cdot\vec{M})(\vec{M}\cdot\hat{s})]$$

$$\sin\phi + \left[\frac{1}{2}(c_1 + \vec{A}\cdot\hat{s}) - \frac{\vec{M}\cdot\vec{M}}{2}(c_1 - \vec{A}\cdot\hat{s})\right]\cos\phi$$

where $$\vec{A} = c_2\vec{P} + c_3\vec{D} \quad (12)$$

with $$c_1 = (d_0^2 + \vec{D}\cdot\vec{D})(p_0^2 + \vec{P}\cdot\vec{P}) + 4d_0p_0\vec{P}\cdot\vec{D}$$

$$c_2 = 2p_0(d_0^2 + \vec{D}\cdot\vec{D}) + 4d_0\vec{P}\cdot\vec{D}$$

$$c_3 = 2d_0(p_0^2 - \vec{P}\cdot\vec{P}). \quad (13)$$

Inventors determined that Equation (11) describes the output photocurrent for a link with discrete PDL characterized by $\vec{P}$ (but otherwise ideal), expressed as a function of the applied modulator phase $\Phi$, and the link parameters.

Inventors recognized that Equation (11) has the general form $$i_{det} = C_1 + C_2\sin\Phi + C_3\cos\Phi \quad (15)$$

with the constants $C_i$ being defined implicitly in the equation. The last two terms imply that the time-varying signal, the part dependent on the modulator phase $\Phi$, is quite similar to the ideal behavior as described by Equation (1). That is, the output in Equation (11) is a sinusoidal variation in $\Phi$ with amplitude $\sqrt{C_2^2+C_3^2}$ and a phase offset of $\tan^{-1}(C_3/C_2)$. In other words, apart from a loss of signal, after accounting for all of the distortions due to unintentional amplitude modulation and to arc re-orientation in FIGS. 3A-3D, the output has exactly the same form as an ideal interferometer that is biased off quadrature by a phase of $\tan^{-1}(C_3/C_2)$. Referring again to FIGS. 3A-3D, the projection onto the $\hat{x}$ axis for SOPs along each of the four arcs (i.e., using great circle arcs connecting each point to $\hat{x}$) is the same as the projection of the SOPs along the initial arc, after a slight displacement along the equator and an overall attenuation.

Figure 4:
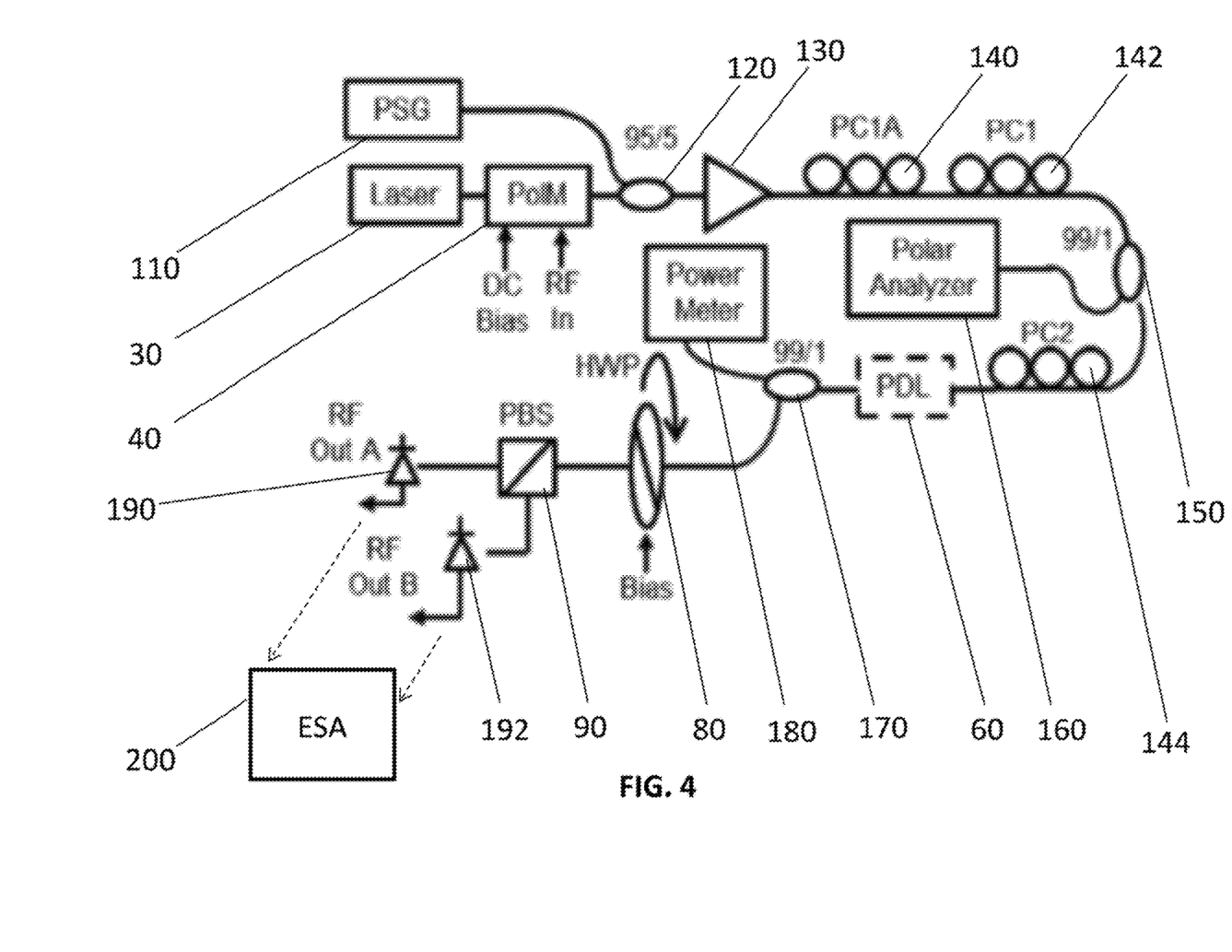
FIG. 4 is a more detailed, illustrative polarization-modulated link for use with an embodiment of the invention.

In view of the above, Inventors determined a method of reducing or canceling polarization-dependent loss in a signal in a polarization-modulated photonic link. An embodiment of the Inventors' method invention is described as follows with reference to a polarization-modulated photonic link, such as shown in FIG. 4. The link includes a standard continuous wave ("CW") laser 30. An example of the CW laser 30 is a standard distributed feedback ("DFB") laser, such as a standard laser diode, a standard quantum cascade laser, or a standard optical fiber laser containing a diffraction grating.

The link further includes a standard polarization modulator ("PolM") 40 that includes an RF modulation input and a DC bias control input. The RF modulation input for the PolM 40 provides analog signal modulation. Light from the CW laser 30 is input to the PolM 40. An example of the PolM 40 is a standard Versawave 40 Gb/s electro-optic polarization modulator. The output of the PolM 40 is combined with a standard polarization state generator ("PSG") 110 via a standard, first optical coupler 120 and is then input to a standard amplifier 130. The first optical coupler 120 includes, for example, a standard 95/5 ratio optical coupler. The amplifier 130 includes, for example, a standard Erbium doped fiber amplifier ("EDFA").

Light from the CW laser 30, after polarization modulation by the PolM 40, passes through the first optical coupler 120, is amplified by the amplifier 130, passes through a at least one standard first polarization controller 140, 142 to a standard, second optical coupler 150, such as a standard tap coupler. The second optical coupler 150 includes, for example, a standard 99/1 ratio optical coupler. The at least one first polarization controller 140, 142 is automated or manually operated. For example, the at least one first polarization controller includes two polarization controllers, such as shown in FIG. 4, one polarization controller 140 to set $\vec{s}_0$ on the correct point of the equator of a Stokes/Poincaré sphere representation and another polarization controller 142 to put the entire modulated arc on the equator.

At an output of the second optical coupler 150, a portion of the light is sent to a standard polarimeter or standard polar analyzer 160 for monitoring purposes. Light from another output of the second optical coupler 150 is sent through at least one second polarization controller 144 and then into a standard, third optical coupler 170. The third optical coupler 170 includes, for example, a standard 99/1 ratio optical coupler. The at least one second polarization controller 144, for example, includes a standard quarter-wave plate, a half-wave plate, and/or a quarter-wave plate connected in series. A standard power meter 180 is connected to a first output of the third optical coupler 170. A standard PolX 80 is connected to a second output of the third optical coupler 170. An example of the PolX 80 is a standard half-wave plate ("HWP"). For example, the half-wave plate is rotatable. For example, such a rotatable half-wave plate includes a standard physical half-wave plate or a standard, integrated-optics half-wave plate. For example, the half-wave plate is connected to a standard rotatable stage. The PolX 80 is mounted in or on a standard discriminating polarizer 90, such as a standard bulk optic beam expander. An example of the bulk optic beam expander is a standard bulk polarization beam splitting cube ("PBS"). The net result of the polarization evolution from the PolM output, through the link and HWP, to the PBS, for example, is that the light at the PBS input is polarized at quadrature, and the detected light at the at least one photodetector ("PD") 190, 192 mimics an ideal interferometric link. For example, two photo detectors are used for ease of alignment purposes.

It is to be understood that the dashed block labeled "PDL" in FIG. 4 does not represent a commercially available component for use in a polarization-modulated photonic link actually reduced to practice. Rather, the PDL block in FIG. 4 represents PDL naturally occurring in a real polarization-modulated photonic link. In other words, an ideal polarization-modulated photonic link in combination with PDL better represents the real polarization-modulated photonic link than the ideal polarization-modulated photonic link alone.

The bulk optic beam expander (e.g., the PBS) is optionally used to find SOPs for the maxima and minima of the transmitted RF signal, intermediate intensities providing the "latitude" and the "poles" of the polarizer's states. The polarization analyzer images the SOPs arriving at the PBS and the second at least one polarization controller to align the states of polarization at the PBS with the states of polarization at the polarization analyzer.

A standard electrical spectrum analyzer ("ESA") 200 operably communicates with the at least one photodetector and is used to monitor harmonics (e.g., the first four harmonics) of the detected power spectrum to quantify PDL impairments. The measured PDL causes a phase shift, as expected from Equation (11) and which will introduce even harmonics to the RF signal passed through the link 10. For example, maximizing the signal is done via a standard alignment technique, such as taught in U.S. Pat. No. 9,172,471 to Hutchinson et al., incorporated herein by reference. The mitigation of PDL can be visualized through the reduction of $2^{nd}$ order harmonics or intermodulation distortion, which are the unwanted byproducts of the phase shift induced by the PDL.

The modulated states of polarization form an arc on the Poincaré sphere, and this procedure aligns the entire modulation arc to fall on the equator (i.e. linear SOPs) of the Poincaré sphere. It should be understood that, in practice, the arc may not fall exactly on the equator because its length from the origin effectively varies with angle. The PBS pass axis is one point on the equator, and after the procedure the SOP associated with zero modulation sits on the equator 90° from that PBS axis, corresponding to the quadrature point for the link 10. Before coupling to the PBS 90, the third optical coupler 170 is used to tap off and to record the optical power which is used to measure the PDL which has been inserted in the link. As before, the half-wave plate 80 can be used as a bias phase adjustment to achieve quadrature. However as shown previously, either or both the DC bias on the PolM 40 and the HWP 80 are optionally utilized to adjust the bias phase in the system.

As discussed above, the link output, with a discrete PDL impairment, behaves as the output of an ideal interferometer with excess loss and an additional offset phase. Inventors have determined that the impairment in phase angle due to the PDL can be corrected by an adjustment of either the HWP at the receiver or the DC bias on the PolM 40 at the transmitter. Spurious harmonics can be suppressed with the only remaining system impact being an overall loss induced in the system by the PDL.

An embodiment of the invention includes a method of reducing polarization-dependent loss in a signal. A constant-intensity, analog, optical signal with modulating polarization is transmitted through an optical communications link 10. The constant-intensity, analog, optical signal with modulating polarization includes an analog radio frequency signal impressed upon a polarization-modulated, laser signal. A polarization-dependent loss of the communications link is determined, the polarization-dependent loss inducing an induced phase shift in the constant-intensity, analog, optical signal with modulating polarization. The constant-intensity, analog, optical signal with modulating polarization is re-oriented using a polarization transformer 80 so as to suppress the induced phase shift.

Optionally, the method further includes transmitting a plurality of training signals respectively corresponding to a plurality of principal states of polarization (e.g., six principal states of polarization) using a polarization state generator 110. The determining a polarization-dependent loss of the communications link 10 includes using the plurality of training signals, a polarimeter 160, and one of at least one photodetector 190, 192 and an optical power meter 180 in communication with the communications link 10. Optionally, the method further includes providing a polarization discriminator 90 comprising a polarization discriminator pass axis. The re-orienting the constant-intensity, analog, optical signal with modulating polarization using a polarization transformer 80 so as to suppress the induced phase shift includes orienting the polarization-modulated laser signal such that a center of an arc corresponding to zero modulation is oriented at 45° degrees in real space to the pass axis of the polarization discriminator based on the polarization-dependent loss. Optionally, the method further includes maximizing a conversion polarization modulation to intensity modulation of the constant-intensity, analog, optical signal with modulating polarization by using the polarization transformer 80, the polarization discriminator 90, and the at least one photodetector 190, 192 or the power meter 180 to convert a modulated light signal to a modulated electrical signal.

Optionally, the communications link 10 comprises a plurality of output power levels corresponding to the each of the six principal states of polarization. The plurality of training signals is received using the polarimeter 160. A plurality of reference states of polarization is generated based on the plurality of training signals using the polarimeter. The purpose of such training signals is, for example, to permit the receiver to be able to cooperate with the transmitter to determine the PDL's orientation and magnitude vector.

The plurality of output power levels is measured using the at least one photodetector 190, 192 and/or the optical power meter 180. A polarization-dependent loss pass axis and an overall loss due to the polarization-dependent loss are calculated from the plurality of reference states of polarization. Optionally, the calculating from the plurality of reference states of polarization a polarization-dependent loss pass axis and an overall loss due to the polarization-dependent loss includes performing a linear best fit. Optionally, a conversion polarization modulation to intensity modulation of the constant-intensity, analog, optical signal with modulating polarization is maximized by using the polarization transformer 80, the polarization discriminator 90, and the at least one photodetector 190, 192 or the optical power meter 180 to convert a modulated light signal to a modulated electrical signal.

Optionally, for the re-orienting the constant-intensity, analog, optical signal with modulating polarization using a polarization transformer 80 so as to suppress the induced phase shift, the polarization-modulated laser signal is oriented such that a center of an arc corresponding to zero modulation is oriented at 45° in real space relative to the polarization discriminator pass axis and is oriented at an offset angle 180° out of phase with the induced phase shift.

Optionally, the polarization discriminator 90 includes a polarization beam splitter in communication with a polarization controller and the one of the at least one photodetector 190, 192 and the optical power meter 180, the polarization beam splitter comprising a polarization beam splitter input. Additionally, the maximizing a conversion polarization modulation to intensity modulation of the constant-intensity, analog, optical signal with modulating polarization includes the following steps. The polarization analyzer 160 is referenced to the polarization beam splitter input, and a polarization of the constant-intensity, analog, optical signal with modulating polarization is rotated using the polarization controller so as to be aligned with the polarization beam splitter, thereby effecting maximum intensity modulation. Optionally, a rotating half-wave plate 80 in communication with the polarization beam splitter 90 is provided. The at least one photodetector includes a first photodetector 190 and a second photodetector 192. The rotating half-wave plate 80 is biased to filter therethrough the constant-intensity, analog, optical signal with modulating polarization aligned with the polarization discriminator pass axis.

Optionally, the constant-intensity, analog, optical signal with modulating polarization is generated using a continuous wave laser 30 communicating with a polarization modulator 40. The polarization modulator 40 includes a first polarization modulator input and a second polarization modulator input. The first polarization modulator input and the second polarization modulator input are, for example, electrical inputs. The first polarization modulator input includes a DC bias control. The second polarization modulator input includes the analog radio frequency signal.

For completeness, it is to be understood that use of a PolM in a real analog photonic link requires alignment of the principal axis. This alignment when carried out can be difficult as the state of polarization ("SOP") can vary with environmental perturbations on the link. Further, the SOP is insufficient. Both the retardance eigenstate of the modulator and the zero modulation output SOP, imaged after passing through the link, must be orthogonal to the discriminator's pass axis on the Poincaré sphere. This can be accomplished using signals and components at the receiver, in concert with prescribed modulation states at the transmitter. Inventors detailed an illustrative method of aligning the SOP for maximum amplitude using a PolM in an analog photonic link in HUTCHINSON et al., Procedure for Aligning Polarization Modulator Link for Amplitude Modulation Applications, Optics Express., Vol. 22, Issue No. 20, pp. 24859-68 (Oct. 6, 2014), which is incorporated herein by reference.

Portions of the method embodiment of the invention described above operate in a standard computing operating environment, for example, a desktop computer, a laptop computer, a mobile computer, a server computer, and the like, in which embodiments of the invention may be practiced. While portions of the invention are described in the general context of program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, autonomous embedded computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention will be described. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller (not shown) connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available media that can be accessed or utilized by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible non-transitory medium which can be used to store the desired information and which can be accessed by the computer.

According to various embodiments of the invention, the computer may operate in a networked environment using logical connections to remote computers through a network, such as a local network, the Internet, etc. for example. The computer may connect to the network through a network interface unit connected to the bus. It should be appreciated that the network interface unit may also be utilized to connect to other types of networks and remote computing systems.

The computer may also include an input/output controller for receiving and processing input from a number of other devices, including a keyboard, mouse, etc. Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as software application, for example, a word processing application, a spreadsheet application, a slide presentation application, a database application, etc.

It should be appreciated that various embodiments of the present invention may be implemented as a sequence of computer-implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. A method comprising:
    transmitting a constant-intensity, analog, optical signal with modulating polarization through an optical communications link, the constant-intensity, analog, optical signal with modulating polarization comprising an analog radio frequency signal impressed upon a polarization-modulated, laser signal;
    determining a polarization-dependent loss of the communications link, the polarization-dependent loss inducing an induced phase shift in the constant-intensity, analog, optical signal with modulating polarization; and
    re-orienting the constant-intensity, analog, optical signal with modulating polarization using at least one polarization transformer so as to suppress the induced phase shift, one polarization transformer of the at least one polarization transformer putting a modulated arc on a Stokes/Poincaré sphere equator.

2. The method according to claim 1, further comprising:
    transmitting a plurality of training signals respectively corresponding to a plurality of principal states of polarization using a polarization state generator,
    wherein said determining a polarization-dependent loss of the communications link comprises using the plurality of training signals, a polarimeter, and one of at least one photodetector and an optical power meter in communication with the communications link.

3. The method according to claim 2, further comprising:
    providing a polarization discriminator comprising a polarization discriminator pass axis;
    wherein said re-orienting the constant-intensity, analog, optical signal with modulating polarization using a polarization transformer so as to suppress the induced phase shift comprises orienting the polarization-modulated laser signal such that a center of an arc corresponding to zero modulation is oriented at 45 degrees in real space to the pass axis of the polarization discriminator based on the polarization-dependent loss.

4. The method according to claim 3, further comprising:
    maximizing a conversion polarization modulation to intensity modulation of the constant-intensity, analog, optical signal with modulating polarization by using the polarization transformer, the polarization discriminator, and the one of the at least one photodetector and the power meter to convert a modulated light signal to a modulated electrical signal.

5. The method according to claim 2, wherein the communications link comprises a plurality of output power levels corresponding to the each of the six principal states of polarization, the method further comprising:
    receiving using the polarimeter the plurality of training signals;
    generating, using the polarimeter, a plurality of reference states of polarization based on the plurality of training signals;
    measuring using the one of the at least one photodetector and the optical power meter the plurality of output power levels;
    calculating from the plurality of reference states of polarization a polarization-dependent loss pass axis and an overall loss due to the polarization-dependent loss.

6. The method according to claim 5, wherein said calculating from the plurality of reference states of polarization a polarization-dependent loss pass axis and an overall loss due to the polarization-dependent loss comprises performing a least squares best fit.

7. The method according to claim 6, further comprising:
    maximizing a conversion polarization modulation to intensity modulation of the constant-intensity, analog, optical signal with modulating polarization by using the polarization transformer, the polarization discriminator, and the one of the at least one photodetector and the optical power meter to convert a modulated light signal to a modulated electrical signal.

8. The method according to claim 5, wherein said re-orienting the constant-intensity, analog, optical signal with modulating polarization using a polarization transformer so as to suppress the induced phase shift comprises orienting the polarization-modulated laser signal such that a center of an arc corresponding to zero modulation is oriented at 45° in real space relative to the polarization discriminator pass axis and is oriented at an offset angle 180° out of phase with the induced phase shift.

9. The method according to claim 4, wherein the polarization discriminator comprises a polarization beam splitter in communication with a polarization controller and the one of the at least one photodetector and the optical power meter, the polarization beam splitter comprising a polarization beam splitter input;

wherein said maximizing a conversion polarization modulation to intensity modulation of the constant-intensity, analog, optical signal with modulating polarization comprises:

referencing the polarization analyzer to the polarization beam splitter input, and         rotating a polarization of the constant-intensity, analog, optical signal with modulating polarization using the polarization controller so as to be aligned with the polarization beam splitter, thereby effecting maximum intensity modulation.

10. The method according to claim 9, further comprising:
providing a rotating half-wave plate in communication with the polarization beam splitter, the at least one photodetector comprising a first photodetector and a second photodetector; and biasing the rotating half-wave plate to filter therethrough the constant-intensity, analog, optical signal with modulating polarization aligned with the polarization discriminator pass axis.

11. The method according to claim 1, further comprising:
generating the constant-intensity, analog, optical signal with modulating polarization using a continuous wave laser communicating with a polarization modulator, the polarization modulator comprising a first polarization modulator input and a second polarization modulator input, the first polarization modulator input comprising a DC bias control, the second polarization modulator input comprising the analog radio frequency signal.

12. The method according to claim 1, further comprising:
suppressing the induced phase shift by adjusting the DC bias control.

* * * * *